US005452221A

United States Patent [19]

Tumidei

[11] Patent Number: 5,452,221

[45] Date of Patent: Sep. 19, 1995

[54] AUTOMATIC DISPENSER OF VISITING CARDS

[75] Inventor: Daniele Tumidei, Forli' , Italy

[73] Assignee: GIPCO S.R.I., Forli' , Italy

[21] Appl. No.: 140,790

[22] Filed: Oct. 21, 1993

[30] Foreign Application Priority Data

Oct. 23, 1992 [IT] Italy .............................. BO92A0370

[51] Int. Cl.$^6$ .............................................. G06F 19/00

[52] U.S. Cl. ..................................... 364/479; 364/468

[58] Field of Search ............... 364/479, 478, 468, 188, 364/189, 401; 221/9; 235/381

[56] References Cited

U.S. PATENT DOCUMENTS

| | | | |
|---|---|---|---|
| 4,873,643 | 10/1989 | Powell et al. | 364/468 |
| 5,036,472 | 2/1991 | Buckley et al. | 364/479 |
| 5,056,029 | 10/1991 | Cannon | 364/468 |
| 5,132,915 | 7/1992 | Goodman | 364/479 |
| 5,146,403 | 9/1992 | Goodman | 364/401 |
| 5,235,519 | 8/1993 | Miura | 364/479 |
| 5,243,174 | 9/1993 | Veeneman et al. | 235/381 |

FOREIGN PATENT DOCUMENTS

| | | |
|---|---|---|
| 2649232 | 6/1989 | France . |
| 2665784 | 2/1992 | France . |
| WO91/09385 | 6/1991 | Germany . |

*Primary Examiner*—Joseph Ruggiero
*Attorney, Agent, or Firm*—Hoffmann & Baron

[57] ABSTRACT

The automatic dispenser of visiting cards comprises, supported and arranged inside a casing (2) a processor unit(3), a monitor (4) and at least two printers (7)managed by the processor unit(3), a keyboard (6) connected to the processor unit(3), a roll(24) of card (9) and a rotary cutter (3), for each printer (7) arranged downstream of the printers (7) and commanded by the processor (3); at least the printers (7), the rolls (24) of card (9) and the cutters (10) being supported by at least one slide (11) which is able to exit from the casing (2) through a hatch (12); the processor unit (3) sending to the printers (7), or to one only should another be malfunctioning, at least the codes necessary for printing each visiting card (5) and, at the end of each printing operations, a code to activate the sound system of the printers (7), which sound system is connected to an input of the processor unit (3) and which is continuously controlled by the processor unit (3) so that a cutter (10) is activated when the sound system of a printer (7) commands, that is, when each individual visiting card (5) has been completely printed.

6 Claims, 3 Drawing Sheets

AUTOMATIC DISPENSER OF VISITING CARDS

BACKGROUND OF THE INVENTION

The invention relates to an automatic dispenser of visiting cards.

This kind of machine is already well-known, vending single visiting cards by using a heat transfer printer housed in a respective protective casing of the type normally used for bar-code machines.

The printer is commanded by a processor, while downstream of it there is a cutter to cut the single cards from a roll of cardboard on which they are printed.

The exact cut of the cards is managed by the processor, based on the parameter commands it has received.

Determining the exact moment of intervention of the cutter is very difficult, since the printer receives the characters necessary for each card and stores them in a memory before the printing operation begins. The time necessary for printing depends on the initial position of the printing head, the character type used, the quantity of data stored and the effective printer print speed in relation to the data to be printed.

It is evident therefore that calculating the time the printer in theory needs to finish each card is very difficult giving rise to the risk of either premature or tardy cutting and thus ruining the card or delaying delivery of the finished product to the client.

In addition, present card dispensers are not very practical from the maintenance point of view, since access to the printer can be difficult and changing the roll of card is a fiddly and time-consuming task.

The principal aim of the present invention is thus to provide an automatic dispenser which is functional, practical and simple to use and easy and fast to maintain.

A further aim is to provide an automatic dispenser that is able to cut single cards exactly without waste either of card or time on the part of the client.

SUMMARY of the INVENTION

The invention as it is characterised in the claims solves the above-mentioned problems by providing an automatic dispenser of visiting cards characterised in that it comprises a support casing which also functions as a container of a processor unit for command and management of the whole dispenser, comprising a central data bank wherein are stored data relative to different types of printable visiting cards as well as data relating to the visiting cards to be printed; a visualising device connected to the processor unit which requests information relative to the visiting card, and also for scaled visualisation of the visiting cards before they are printed; and further comprising a peripheral command unit, manageable by the user, for on-line interaction with the processor unit for the introduction of data into the central data bank; at least two peripheral printing units served by the processor unit; a group for supplying a card roll to each of the peripheral printing units; at least two cutters arranged downstream of each of the peripheral printing units and aimed at cutting the respective card roll on receiving a relative command from the processor unit; at least the said peripheral printing units, the said supply group and the said cutter being supported by at least one mobile carriage or slide which is horizontally mobile between an internal and an external position to the said casing at at least one hatch made in the said casing; collection means of the visiting card; a display of the types of visiting cards which can be made; receiving means for banknotes connected to the processor unit and aimed at sending a start-cycle message to the processor unit for the beginning of the card printing; the said processor unit, through its monitor, requesting the user to select the kind of ticket required, the data to be printed on the card and the number of cards required and, following the visualisation in scale on the visualiser of a visiting cards as it will appear when printed, sending to the peripheral printing units at least the data necessary for printing a desired number of visiting cards and, at the termination of the said data to be inserted on each visiting card, a character or code to activate the sound circuit of the peripheral printing units; the sound circuit of the peripheral printing units being connected to an input of the processor unit which activates the at least one of the cutters on receiving a signal from the said sound circuit, and by cutting separates one visiting card from the card roll.

BRIEF DESCRIPTION of the DRAWINGS.

Further characteristics and advantages of the present invention will better emerge from the detailed description that follows, of an embodiment of the invention, herein illustrated purely in the form of a non-limiting example in the accompanying figures, in which.

Figure 1:
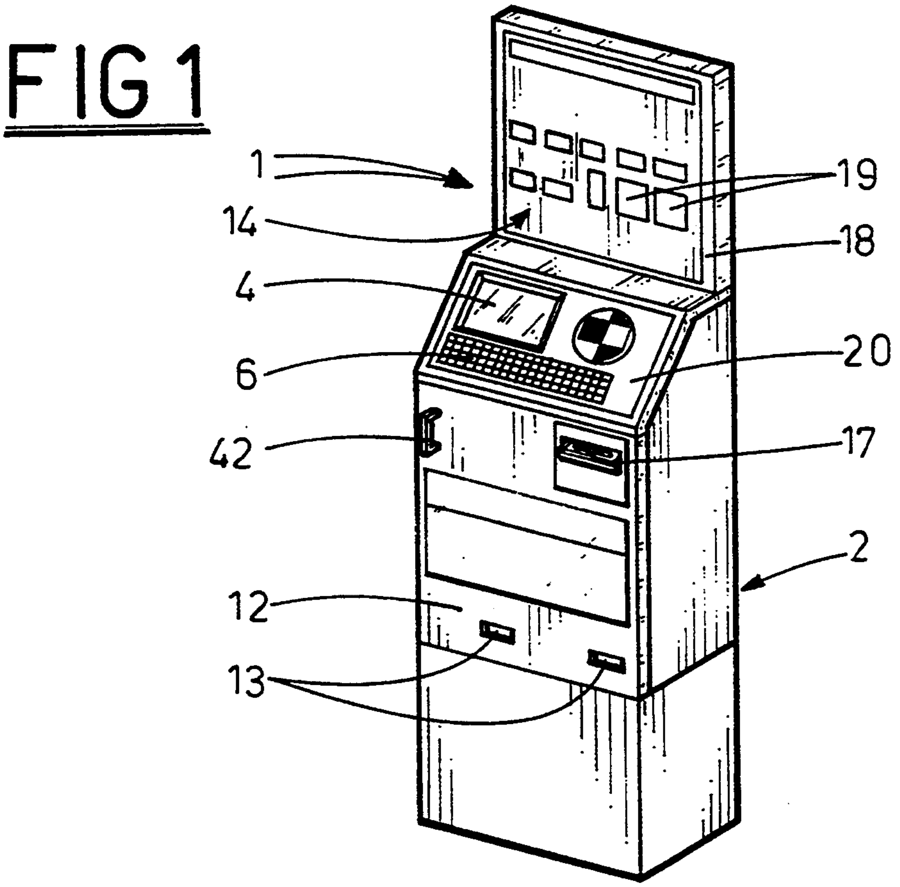
FIG. 1 shows a perspective view of the dispenser.

DESCRIPTION of the PREFERRED EMBODIMENT.

With reference to the FIGS., the automatic dispenser 1 of the invention is constituted by a protective casing 2 supporting and protecting a processor unit 3, a monitor 4, a peripheral command unit 6, at least two peripheral printing units 7, feeding means 8 of a card roll 9, a cutter 10, collection means 13 for the visiting cards 5 and a display 14. The monitor 4, the command unit 6 and the collection means 13 are all arranged at respective apertures in the casing 2 so as to enable a user to operate the dispenser. The casing 2 has a vertical plane 18 arranged superiorly constituting the display 14, to which vertical plane 18 facsimiles 19 of various kinds of visiting cards 5 (constituting the range of cards the dispenser can make) can be attached. The casing 2 comprises, below the vertical plane 18, an inclined plane 20 having apertures (not illustrated) to which the monitor 4, connected by an electrical cable 30 (see FIG. 4) to an output of the processor unit 3, and the command unit 6 constituted by a membrane keyboard for personal computers and connected by a further electrical cable 31 to an input of the same processor unit 3, are applied. In particular, the keyboard 6 is identical to the standard type used for personal computers for simplicity and usability.

Below the inclined plane 20 the casing 2 is practically parallelepiped and houses the processor unit 3, the two peripheral printing units 7, the supply group 8 and the cutters 10, all of which are supported by at least one carriage or slide 11 (see FIGS. 2 and 3). The slide 11 is bilaterally provided with U-guides 21 which are outwardly open and which embrace respective idle casters 22 fixed internally of the casing 2 sides. The slide 11 is positioned exactly to correspond with a frontal hatch 12 in the casing 2, which hatch 12 is equipped with an opening handle 42 (see FIG. 1): by opening the hatch 12 the slide 11 can be removed from the casing 2 so as to simplify maintenance and/or substitution both of the slide 11 itself and other operating parts.

The two peripheral printers 7 are constituted by two inkjet printers and are supported side by side (see FIG. 2) by the slide 11 in proximity of the hatch 12. FIG. 3 shows that each printer 7 is sustained by a relative support 23 constituted by a pair of vertical walls 27 which are perpendicular to the hatch 12 and lean on the slide 11, to which they are constrained. Each pair of the vertical walls 27 is surmounted by a U-shaped support and containing element 34 destined to house a relative printer 7. A U-shaped constraining element 36 is a part of the support element 23, which constraining element 36 superiorly straddles the relative printer 7 and is connected to the support and containing element 34 by means of a connecting screw 41.

Figure 2:
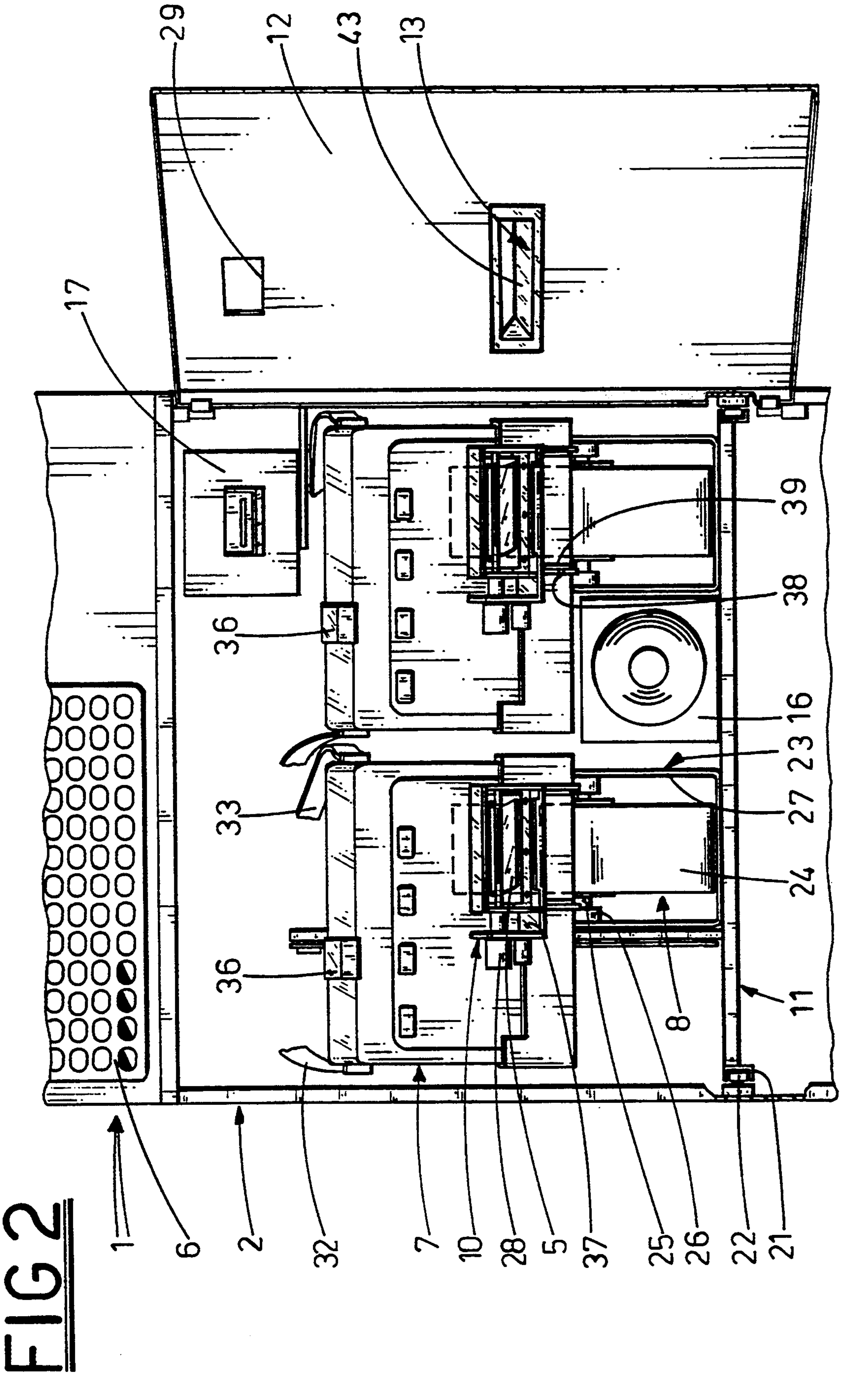
FIG. 2 shows a frontal view of some details of the dispenser of FIG. 1.

FIG. 2 schematically illustrates the trajectory of the card 9 from the roll 24 as it passes through the printer 7. This trajectory is straight so that the card 9 is not subjected to deformation during the printing operation and especially during periods of inactivity at the end of which any such deformations could become permanent. Further, the straight trajectory of the card 9 through the printer 7 facilitates the advancement of the card 9 by the printer 7, which advancement is made even easier by the inclination of the printers 7 in the direction of the collection means 13, as can be seen in FIG. 3, all of which also facilitates the final drop of the finished cards into the collector 13.

Figure 4:
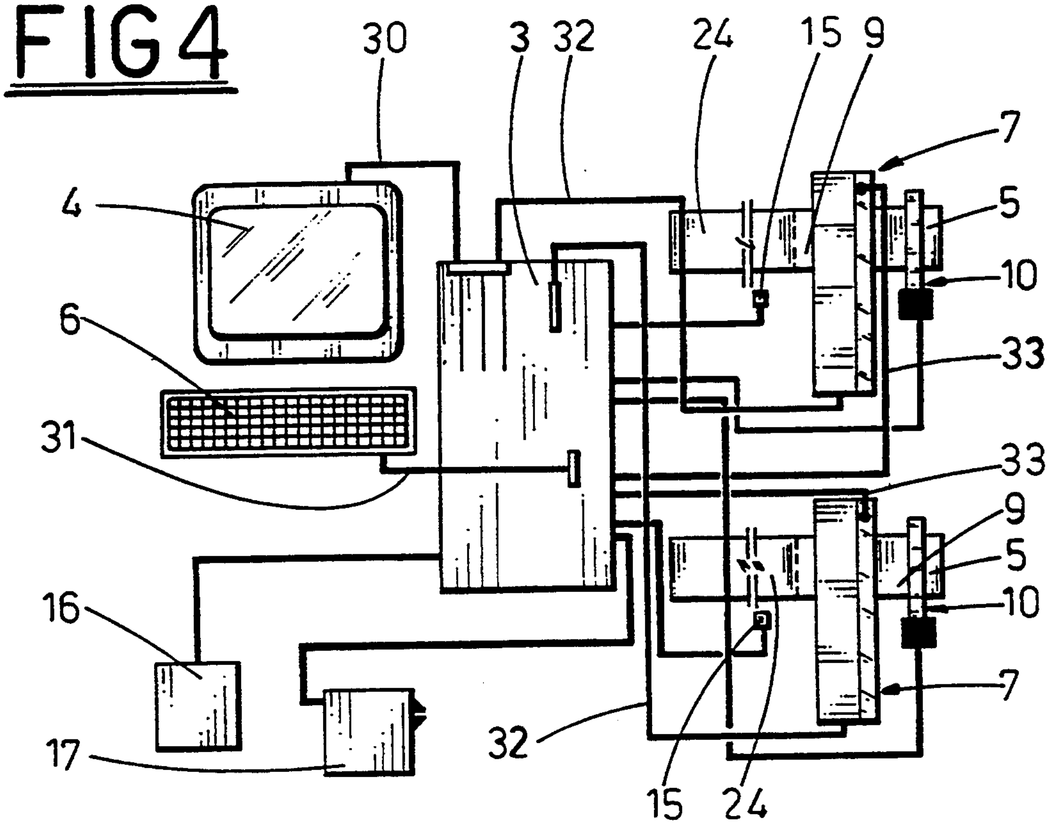
FIG. 4 shows a functional scheme of the principal organs of the automatic dispenser according to the present invention.

FIG. 4 shows how the input of each printer 7 is connected by an electrical cable 32 to an output of the processor unit 3. Computer peripheral printers 7 will typically include a sound system or sound circuit capable of emitting an audible "beep" in response to an appropriate input signal or special character. Here, the sound circuit of each printer 7 is connected through a further multi-core electrical cable 33 to an input of the processor unit 3, for reasons which will be explained hereinbelow. The same electric cable 33 connects an output of the processor unit 3 to a servo-switch (not illustrated) inserted along the electrical supply circuit of each printer 7.

Figure 3:
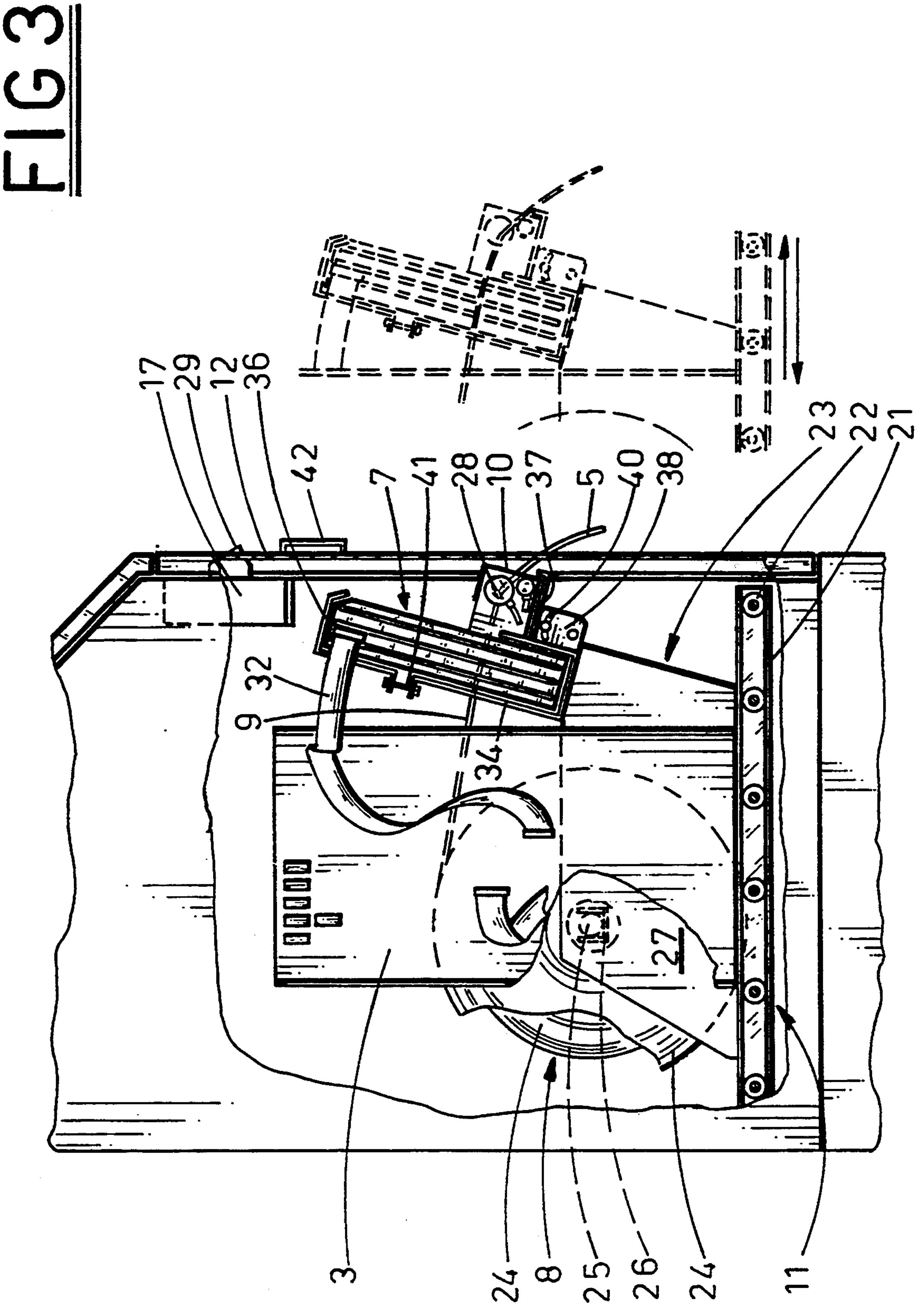
FIG. 3 shows a lateral view of some details of the dispenser of FIGS. 1 and 2.

By comparing FIGS. 2 and 3, it can be observed how the supply group 8 is constituted by a roll 24 of card 9 for each printer. Each roll 24 is supported by a pivot 25 which opposite ends are housed in respective seatings afforded by U-shaped elements 26 fixed on the opposing faces of the vertical walls 27 fixed inferiorly to the slide 11. Sensor means 15 are also fixed to the vertical walls 27, which sensor means 15 are connected to inputs of the processor unit 3 (see FIG. 4) and indicate when the rolls 24 are finished.

Turning now to FIG. 3, where one full roll 24 and one half-empty roll 24 are illustrated, it can be observed that each printer 7 is sustained at such a level that the card take-up area is more or less at the same height as the upper generatrix of the roll 24 when half-used up, so that the card 9 moves along a more or less straight trajectory from the roll 24 to the cutter 10 both when the roll 24 is full and when it is almost empty.

A cutter 10 is located in proximity of each printer 7, arranged by the side of the printer 7 where the card 9 exits. Each cutter 10 is of known rotary type, for example a rotary guillotine, and is motorised by a relative electric motor 28 connected to the processor unit 3. Each cutter 10 is supported by a support and containing element 37 inferiorly provided with a couple of parallel tabs 39 supported by respective shelves 38 fixed to the support and containing element 34 of the support 23 of the relative printer 7. As illustrated in FIG. 3, the tabs 39 are pivoted to the shelves 38 about an axis which is parallel to the axis of the relative roll 24 in such a way as to permit of adjusting the position of the cutter 10 with respect to the relative printer 7.

Banknote receiving and verifying means 17 of known type are connected to an input of the processor unit 3, and are supported by the casing 2 in proximity of one of the casing 2 sides and at an aperture 29 made in the hatch 12, as illustrated in FIG. 2.

A collector 13 is fixed to the hatch 12 and is constituted by a wall 43 arranged at a respective aperture in the hatch 12 and inclined upwards so as to realise, in combination with the cutter 10, a collection pocket.

FIG. 1 shows one collection means 13 per printer 7, but each printer can share a single collection means constituted by a single wall 43 arranged in front of both printers 7.

FIG. 2 shows how a peripheral loudspeaker or other peripheral sound diffusion means 16 can be connected to an output of a processor unit 3, as in FIG. 4, which means 16 operate in synchrony with the monitor 4.

Up to this point the processor unit 3 has not been described in detail. It is in fact a data storage and processing bank. The processor unit 3 controls and manages the whole dispenser 1 and comprises a central data bank within which are stored and from which are dispensed the fixed data relating to the various types of cards 5 which can be printed and the variable data relating to the cards 5 which are requested by the user.

The functioning of the processor unit 3 will better emerge from the following description of the functioning of the entire dispenser 1.

Banknotes are inserted into the aperture 29 and therefore into the receiving and verifying means 17, and once the said means 17 have verified that a correct amount has been paid, a start-cycle message is sent to the processor unit 3 and the monitor 4 and/or the loudspeaker 16 begins to prompt the user to answer a series of specification questions, which responses are given via the keyboard 6. The questions will obviously be of the following type: which kind of visiting cards 5 to print, which can be answered after studying the facsimiles 19 displayed on the display 14; which information is to be printed; the number of cards desired. Before proceeding to the printing operation, the monitor 4 visualises a print preview in scale, and if the user is satisfied he gives the command to proceed. At this point a command is sent by the processor 3 to each printer 7, which command defines each visiting card 5 plus a special final character to activate the sound system of the printers 7. The abovementioned final character is received by the printers 7 after a card has been printed, and each printer 7 then activates its sound system. This, however, does not cause an audible "beep", but instead sends a signal along the electrical cable 33 to the process unit 3, where it is interpreted as an end print signal and as such is adapted to command the activation of the cutter 10, which cutter 10 then proceeds to separating a finished card 5 from a roll 24. Then another cycle begins, wherein the processor unit 3 sends a new series of data relative to another card 5 plus the character activating the sound system, exactly as before. When all the visiting cards 5 requested have been printed and cut, the processor unit 3 sends a publicity or informative message to each printer 7 in order to cause the card roll 9 to advance by a predetermined tract. This is because between the printer 7 printing zone and the cutting zone there exists a gap, since each time the cutter 10 is activated, downstream of the printers 7 there are two visiting cards 5 that have already been printed but obviously not yet cut; the ensuing cut dividing the two cards 5. Thus in order to separate the last visiting card 5 from the roll 9 the card roll 9 has to be advanced up until the final edge of the last visiting card 5 has been brought up to the cutter 10 to be cut. The publicity or informative message performs the function of causing the roll 9 to be advanced. The processor unit 3, during each printing phase, continuously controls the printers' 7 functioning to make sure it is perfect, as well as the card rolls 9. Should a problem in functioning be revealed, for example if the end of a roll 9 is reached, or should a printer 7 be out of toner, or indeed a printer 7 malfunction, the data relative to the present visiting cards 5 is automatically sent to the other printer, while the malfunction in the first printer 7 is signalled.

When a card roll 9 has to be changed, or when maintenance is to be performed on the operative elements of the automatic dispenser 1, it is sufficient to open the hatch 12 by applying the handle 42 and drawing the slide 11 outwards, as illustrated in FIG. 3 with a broken line. Thus access to the various functioning elements of the dispenser 1 is rendered very simple: for example, to substitute a roll 24 it is sufficient to lift it by pulling out the opposite ends of the pivot 25 from the U-elements 26 and, after having inserted the pivot 25 into a new roll 24, reinsert the opposite ends of the pivot 25 into the U-elements 26 and insert the free end of the roll 9 into the printer 7.

The main advantage of the dispenser 1 of the present invention consists in the rapidity of access to all operative parts for maintainance operations.

The use of inkjet printers, apart from being more economical, further offers the advantage of providing printing uniformity up until the last printed visiting card has been completed. The use of these more economical inkjet printers permits the use of two printers in parallel as in this invention, and the fact that there are two provides for a rapid execution of the operation and a considerable guarantee of continuity, since even if one of the printers is out of order, the other can continue working normally.

The presence of a loudspeaker is also advantageous since through it the user can be guided in his or her choices. Also advantageous is the use of a standard personal computer keyboard, since it will be familiar to many customers who use personal computers for their everyday work.

What is claimed:

1. An automatic dispenser of visiting cards comprising a casing (2) functioning both as a support for the automatic dispenser (1) and as a container of:

a processor unit (3), for commanding and managing the dispenser (1), comprising a central data bank wherein are stored data relative to a variety of visiting cards (5), of which the dispenser (1) can print various types, and wherein are also stored data provided by a customer relating to which kind of visiting card (5) is desired by the customer and what is to be printed on each visiting card (5) requested by the customer;

a monitor (4), connected to the processor unit (3), which requests a customer to supply information appertaining to a visiting card (5), and which monitor (4) also provides a scaled visual facsimile of the visiting card (5) before printing is effected;

a peripheral command unit (6), manageable by a customer, for on-line interaction with the processor unit (3) leading to an introduction of data relating to a visiting card (5) into the central data bank of the processor unit (3);

at least two peripheral printing units (7) dedicated to the processor unit (3);

a supply group (8) for supplying a continuous strip of card (9) from a card roll (24) to each of the at least two peripheral printing units (7);

at least two cutters (10) arranged downstream of each of the at least two peripheral printing units (3) and having a function of separating finished cards from the roll (24) of card (9) on receiving a command from the processor unit (3); at least: the at least two peripheral printing units (7), the supply group (8), and the at least two cutters (10) being supported by at least one mobile slide (11) which is horizontally mobile between an internal and an external position of the casing (2) at a location where at least one hatch (12) is made in the said casing (2);

a collector (13) of the visiting cards (5) when the visiting cards (5) are ready for delivery to the customer;

a display (14) of various types of visiting cards (5) which the automatic dispenser (1) make;

receiving and verifying means (17) for banknotes, connected to the processor unit (3), which receiving and verifying means (17) send a start-cycle message to the processor unit (3) to begin a card composing and printing operation; the processor unit (3) causing the monitor (4) to visualise requests to the customer as follows: to select a visiting card (5) type; to provide data to be printed on a visiting card (5) type selected and a number of a visiting card (5) required and, after a display on the monitor displays (4) of a scaled facsimile of the visiting card (5) which has been selected and composed by the customer as it will appear when printed; the processor unit (3) then sending to the at least two peripheral printing units (7) at least all data necessary for printing a requested number of visiting cards (5) and, at the termination of a communication of data to be inserted on each of requested number of visiting cards (5), affixing to the communication a character or code to activate a sound circuit of the at least two peripheral printing units (7); a sound circuit of the at least two peripheral printing units (7) being connected to an input of the processor unit (3) which activates the at least one of the cutters (10) on receiving a signal from the sound circuit, and by means of a cutting operation separates a visiting card (5) from the roll (24) of card (9).

2. An automatic dispenser as in claim 1, wherein the processor unit (3) is connected to an output of a sensor (15) indicating an end roll situation in the rolls (24) of card (9) and sends data to each of the peripheral printers (7) or, when one of the printers (7) has finished a roll (24) of card (9), or is not able to function normally, only to one printer (7) which is still able to function correctly to print out all or all remaining requested visiting cards (5).

3. An automatic dispenser as in claim 1, comprising a peripheral sound diffuser unit (16), commanded by the processor unit (3) and operating in combination and in synchrony with the monitor (4).

4. An automatic dispenser as in claim 1, wherein the at least two printers (7) are inkjet printers.

5. An automatic dispenser as in claim 4, wherein each of at least two peripheral printers (7) is a linear printer and is arranged along a trajectory defined between a supply group (8) of the card and a cutter (10) of the card (9) in such a way that a strip of card (9) coming from a roll (24) has a practically straight trajectory.

6. An automatic dispenser as in claim 5, wherein the at least two peripheral printers (7) are inclined towards a hatch (12) and a trajectory of the roll (24) of card (9) is inclined downwards to encourage a visiting card (5) to fall into a collector (13).

* * * * *